United States Patent
Souza et al.

(10) Patent No.: US 8,306,302 B2
(45) Date of Patent: Nov. 6, 2012

(54) NOISE SUPPRESSION IN DIAGNOSTIC IMAGES

(75) Inventors: Andre Souza, Webster, NY (US); Peter D. Burns, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 1038 days.

(21) Appl. No.: 12/239,844

(22) Filed: Sep. 29, 2008

(65) Prior Publication Data

US 2010/0080430 A1   Apr. 1, 2010

(51) Int. Cl.
  *G06K 9/00*   (2006.01)
(52) U.S. Cl. ........ 382/131; 382/132; 382/274; 382/275; 382/254; 382/128
(58) Field of Classification Search .......... 382/128, 382/131, 132, 100, 254, 274, 275; 358/1.9, 358/3.31, 447, 461, 463; 348/606; 128/922
See application file for complete search history.

(56) References Cited

U.S. PATENT DOCUMENTS

| | | | |
|---|---|---|---|
| 7,260,248 B2* | 8/2007 | Kaufman et al. | 382/128 |
| 7,466,848 B2* | 12/2008 | Metaxas et al. | 382/128 |
| 2006/0233454 A1* | 10/2006 | Cheng et al. | 382/274 |
| 2006/0233455 A1* | 10/2006 | Cheng et al. | 382/274 |
| 2008/0317314 A1* | 12/2008 | Schwartz et al. | 382/131 |
| 2009/0136103 A1* | 5/2009 | Sonka et al. | 382/128 |

OTHER PUBLICATIONS

Perona et al., "Scale-Space and Edge Detection Using Anisotropic Diffusion," IEEE Transaction in Pattern Analysis and Machine Intelligence, vol. 12, No. 7, Jul. 1990, pp. 629-639.
Li et al., J. Biol Chem, 2005, 280, 38513.
Nyhammer, T. et al., food. Chem. 1985, 17, 289-296.
Gutsche, B. et al., Biochem. J. 1999, 343, 11-19.
C. Unverzagt et al., Tetrahedron Lett. 2004, 45, 295-297.

* cited by examiner

*Primary Examiner* — Ali Bayat (57) ABSTRACT

A method for suppressing noise in a diagnostic image executes one or more iterations of segmenting the image to identify and label one or more regions in the image; and performing selective diffusion on at least one of the one or more labeled regions in the image. A homogeneity value is computed for the region. A diffusion conductance function is generated for the region according to an intensity gradient between adjacent digital image elements within the region. The diffusion process is applied to a plurality of digital image elements within the region.

16 Claims, 9 Drawing Sheets

NOISE SUPPRESSION IN DIAGNOSTIC IMAGES

FIELD OF THE INVENTION

The invention relates generally to the field of diagnostic imaging and more particularly relates to a method for noise suppression for images of two or more dimensions that iteratively segments the image content and applies a diffusion process appropriate for each segment.

BACKGROUND OF THE INVENTION

Noise is often present in acquired diagnostic images, such as those obtained from computed tomography (CT) scanning and other x-ray systems, and can be a significant factor in how well real intensity interfaces and fine details are preserved in the image. In addition to influencing diagnostic functions, noise also affects many automated image processing and analysis tasks that are crucial in a number of applications.

Methods for improving signal-to-noise ratio (SNR) and contrast-to-noise ratio (CNR) can be broadly divided into two categories: those based on image acquisition techniques and those based on post-acquisition image processing. Improving image acquisition techniques beyond a certain point can introduce other problems and generally requires increasing the overall acquisition time. This risks delivering a higher X-ray dose to the patient and loss of spatial resolution and may require the expense of a scanner upgrade.

Post-acquisition filtering, an off-line image processing approach, is often as effective as improving image acquisition without affecting spatial resolution. If properly designed, post-acquisition filtering requires less time and is usually less expensive than attempts to improve image acquisition. Filtering techniques can be classified into two groupings: (i) enhancement, wherein wanted (structure) information is enhanced, hopefully without affecting unwanted (noise) information, and (ii) suppression, wherein unwanted information (noise) is suppressed, hopefully without affecting wanted information. Suppressive filtering operations may be further divided into two classes: a) space-invariant filtering, and b) space-variant filtering.

Space-invariant filtering techniques, wherein spatially independent fixed smoothing operations are carried out over the entire image, can be effective in reducing noise, but often blur important structures or features within the image at the same time. This can be especially troublesome because details of particular interest often lie along an edge or a boundary of a structure within the image, which can be blurred by conventional smoothing operations.

Various methods using space-variant filtering, wherein the smoothing operation is modified by local image features, have been proposed. Diffusive filtering methods based on Perona and Malik's work (1990) [Perona and Malik, "Scale-space and edge detection using anisotropic diffusion", *IEEE Trans. Pattern Anal. Machine Intelligence,* 1990 vol. 12, pp. 629-639] have been adapted to a number of image filtering applications. Using these methods, image intensity at a pixel is diffused to neighboring pixels in an iterative manner, with the diffusion conductance controlled by a constant intensity gradient for the full image. The approach described by Perona and Malik uses techniques that preserve well-defined edges, but apply conventional diffusion to other areas of the 2-D image. While such an approach exhibits some success with 2-D images, however, there are drawbacks. One shortcoming of this type of solution relates to the lack of image-dependent guidance for selecting a suitable gradient magnitude. More importantly, since morphological or structural information is not used to locally control the extent of diffusion in different regions, fine structures often disappear and boundaries that are initially somewhat fuzzy may be further blurred upon filtering when this technique is used.

Three-dimensional imaging introduces further complexity to the problem of noise suppression. In cone-beam CT scanning, for example, a 3-D image is reconstructed from numerous individual scans, whose image data is aligned and processed in order to generate and present data as a collection of volume pixels or voxels. Using conventional diffusion techniques to reduce image noise can often blur significant features within the 3-D image, making it disadvantageous to perform more than rudimentary image clean-up for reducing noise content.

Thus, it is seen that there is a need for improved noise suppression filtering methods that reduce image noise without compromising sharpness and detail for significant structures or features in the image.

SUMMARY OF THE INVENTION

An object of the present invention is to advance the art of noise suppression in diagnostic imaging. With this object in mind, the present invention provides a method for suppressing noise in a diagnostic image, the method comprising executing one or more iterations of: segmenting the image to identify and label one or more regions in the image; and performing selective diffusion on at least one of the one or more labeled regions in the image by: computing a homogeneity value for the region; generating a diffusion conductance function for the region according to an intensity gradient between adjacent digital image elements within the region and applying the diffusion process to a plurality of digital image elements within the region.

Another object of the present invention is to apply noise suppression selectively to different regions of the image and to use iterative processing in order to take advantage of improved region definition with each iteration.

These objects are given by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. Elements of the drawings are not necessarily to scale relative to each other.

DETAILED DESCRIPTION OF THE INVENTION

The following is a detailed description of the preferred embodiments of the invention, reference being made to the figures in which the same reference numerals identify the same elements of structure in each of the figures.

Embodiments of the present invention provide an improved spatial filtering method for image noise suppression that is not only suitable for 2-D images, but can be readily adapted for use with 3-D images, as well as with images of higher dimension. This can include, for example, 4-D images, for which a temporal dimension factor or other value is used in addition to 3-D spatial coordinates. The description that follows is primarily directed to embodiments of the present invention that handle 3-D images, including reconstructed images from 2-D images, for example. However, the same overall sequence and principles can be applied for 2-D images, for 4-D images, or for images having more than 4 dimensions associated with each discrete digital image element (pixel or voxel).

The term "image element" or "digital image element" refers to a pixel (from "picture element" and commonly used for an image with two dimensions) or to a voxel (from "volume picture element" for an image of three or more dimensions).

The term "region" is used in the present application to describe an area of a 2-D image or, correspondingly, a volume of a 3-D or 4-D or higher image that contains a grouping of contiguous image elements (that is, pixels in the 2-D domain; voxels in 3-D, 4-D, or higher-dimensioned images). A region is defined by intensity characteristics of its image elements (pixels or voxels), such as where their intensity values lie within a certain range of values, for example, as well as where a grouping of pixels is bounded by discernable bounding structures or features in the image.

The term "adjacent", or "n-adjacent" where n is an integer, when used to describe an image element, pixel or voxel, indicates that two image elements are in some way contiguous. For a two-dimensional image, one pixel may be adjacent to another either at one of its 4 vertices or along any of its 4 edges. For a three-dimensional image, one voxel may be adjacent to another either at one of its 8 vertices, or along one of its 12 edges, or along one of its 6 faces (to its so-called "6-adjacent" voxels). A voxel is thus adjacent to as many as 26 neighboring voxels.

Figure 1A:
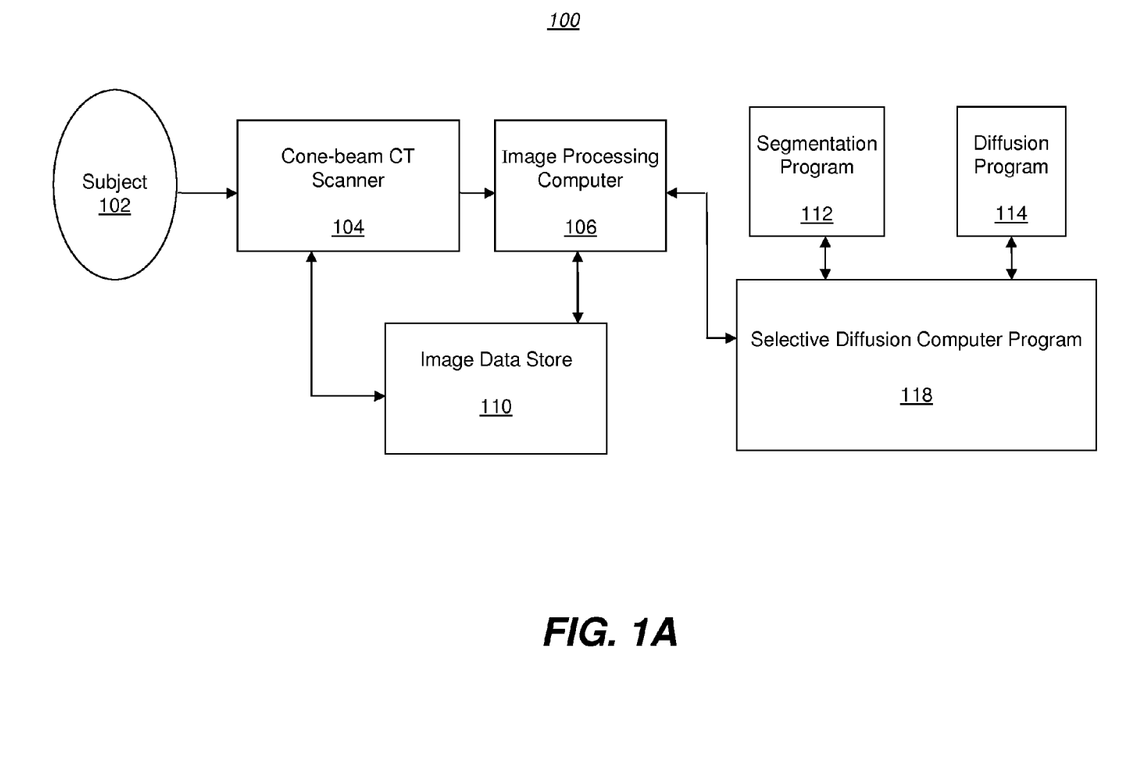
FIG. 1A is a schematic diagram showing components of an image acquisition and processing system for executing the method of the present invention in one embodiment.

FIG. 1A shows components of an image acquisition and processing system 100 for executing the method of the present invention for 3-D imaging in one embodiment. Image acquisition and processing system 100 includes an imaging system, shown in the embodiment of FIG. 1A as a cone-beam CT scanner 104. The method of the present invention could alternately be used with other types of imaging systems, including 2-D, 4-D, or other systems.

In FIG. 1A, CT scanner 104 images a subject 102, such as a patient, to produce a volume of image data as a sequence of individual image slices. The entire set of image slices provides volume image data for the subject. The number of slices taken from one direction may vary from a few dozen to hundreds of image slices, limited by the current CT scanner resolution. The image slices are conventionally stored in an image data store 110 as a DICOM series, as reported in National Electrical Manufacturers Association (NEMA) ed.: Digital Imaging and Communications in Medicine (DICOM) Part 3, PS 3.3 (2003). These DICOM series can be referred to as pre-processed image data.

Post-processing of image data can take any of a number of forms. In one embodiment, an image processing computer 106 uses the DICOM series stored in image data store 110 to produce filtered (noise-suppressed) image slices. In the embodiment of FIG. 1A, a selective diffusion computer program 118 uses logic from both a segmentation program 112 and a diffusion program 114 for providing filtered image output, using an iterative sequence described in more detail subsequently.

An acquired digital 3-D image is referred to as a scene, and represented as a pair $C=(C, f)$, wherein:

$$C=\{c|-b_j \leq c_j \leq b_j \text{ for some } b_j \epsilon Z_+^3\}$$

where $Z_+^3$ is the set of 3-tuples of positive integers called voxels, $f$ is a function whose domain, termed the scene domain, is C. The range of $f$ is a set of integers [L,H] and for any $c \epsilon f(c)$, $f(c)$ is referred to as the intensity of c. Domain C corresponds to a binary scene if the range of $f$ is $\{0,1\}$.

As described in the 2-D noise suppression filtering work of Perona and Malik, cited earlier, anisotropic diffusion is a locally adaptive smoothing process that attempts to minimize blurring near object boundaries. A mathematical formulation in a continuous domain, known to those familiar with Gauss's theorem from vector calculus, of the diffusion process on a vector field V at a point c in coordinate-free form can be given by:

$$\frac{\partial f}{\partial t} = div V = \lim_{\Delta t \to 0} \int_s V ds \quad (1)$$

where $\Delta t$ is the volume that is enclosed by the surface s that surrounds point c and $ds=u\,ds$, where u is a unit vector that is orthogonal and outward-directed with respect to the infinitesimal surface element ds. The intensity flow vector field V controls the diffusion process and is defined as:

$$V=GF \quad (2)$$

where G is the diffusion conductance function, and F is the scene intensity gradient vector field. In a linear isotropic diffusion process, G is a constant. In the Perona and Malik article noted earlier, the authors indicate that such diffusion strategies blur object boundaries and structures. They present an alternative anisotropic diffusion method in which G varies at each location in the scene as a nonlinear function of the magnitude of the scene intensity gradient so that smoothing within a region with low intensity gradients is encouraged, and smoothing across boundaries, wherein the magnitude of the gradients is much higher, is discouraged.

As compared to earlier noise suppression techniques, the method of the present invention is iterative, with steps that repeat one or more times in order to more effectively apply diffusion processes with each iteration and to yield improved results.

Figure 1B:
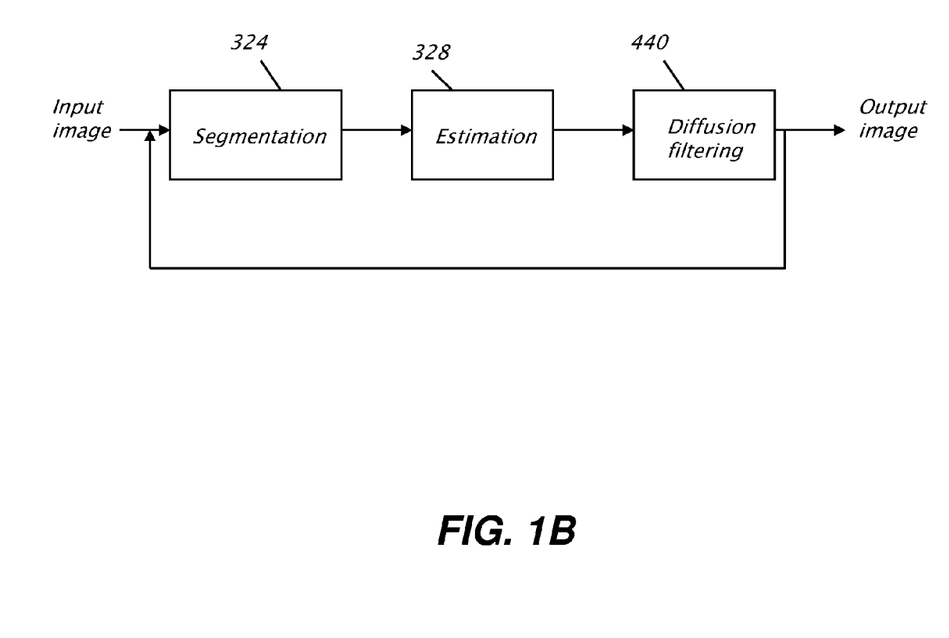
FIG. 1B is a logic flow diagram that shows the overall sequence of iterative processing used in embodiments of the present invention.

The flow diagram of FIG. 1B shows the sequence of processes that are iteratively applied for noise suppression in embodiments of the present invention. A segmentation step 324 is first executed, in order to identify different regions of the image. In an estimation step 328, appropriate diffusion parameters are computed for use within each region. Estimation step 328 computes parameters using statistical values that relate to intensity differences in the image data.

Still referring to FIG. 1B, a diffusion filtering step 440 then applies the different diffusion parameters that have been computed to each region. This sequence then repeats one or more times in order to provide improved noise suppression. In subsequent processing through this loop, the filtered image from the previous iteration is once again segmented and diffusion filtering once again applied. With this iterative sequence, each filtering operation in diffusion filtering step 440 improves the quality of the subsequent segmentation step 324. At the same time, each segmentation step 324 tends to define a region more closely, so that the region over which a particular diffusion operation is executed changes slightly from one iteration of this sequence to the next.

Although diffusion is generally a continuous process in image processing, diffusion using the method of the present invention is achieved by an iterative process for sampled data. Embodiments of the present invention operate by labeling one or more different 3-D regions, then adaptively controlling the rate of diffusion within each region. In adaptively controlling this rate, a selective choice of conductance functions is made according to the different image regions, providing a non-linear, anisotropic diffusion process.

Figure 2:
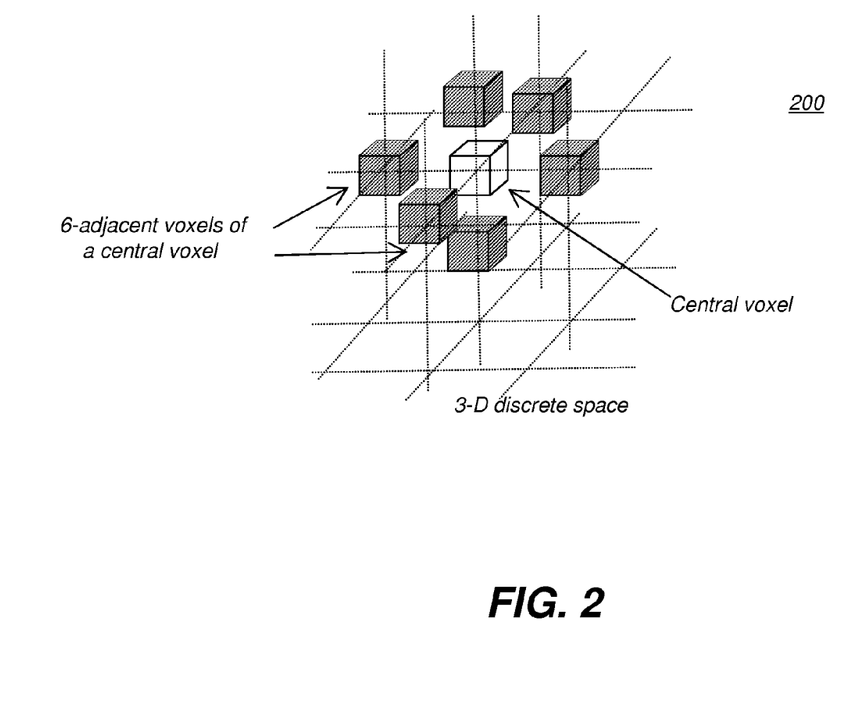
FIG. 2 is a perspective view showing some of the voxels adjacent to a central voxel in a 3-D image.

To do this, embodiments of the present invention use adjacent image elements; in one 3-D embodiment, this is the 6-adjacent voxel neighborhood in 3-D discrete space. The 6-adjacent voxels have surface adjacency, as described earlier. FIG. 2 illustrates an exemplary 3-D representation 200 for a 6-adjacent voxel neighborhood for a central voxel.

Figure 3A:
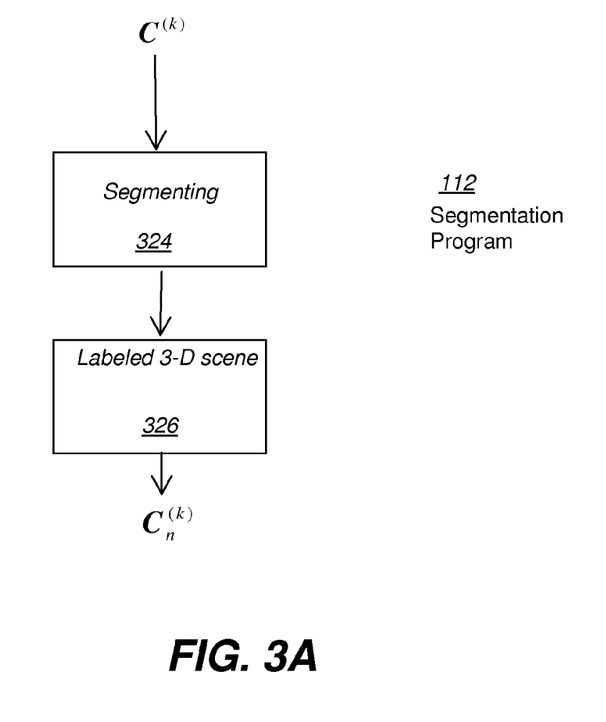
FIG. 3A is a logic flow diagram showing segmentation processing according to one embodiment of the present invention.

As was described with reference to FIG. 1B, embodiments of the present invention carry out anisotropic diffusion as an iterative method. For the description of this method that follows, variable k denotes the iteration number. Then $C^{(k)}=(C, f^{(k)})$ denotes the scene resulting from one iteration of diffusion processing, at the kth iteration. The logic flow diagram of FIG. 3A shows how segmentation program 112 works according to one embodiment. In this processing, a given input scene $C^{(k)}$ is segmented at a segmentation step 324 and is subsequently labeled at a labeling step 326. The output of segmentation program 112, then, is a labeled scene $C_n^{(k)}=(C, f_n^{(k)})$ containing a number n of regions of image elements. By way of example, segmentation step 324 is done automatically by setting a fixed threshold value. Voxels with intensity value above the fixed threshold are labeled foreground voxels; otherwise, voxels are labeled as background voxels. It should be noted that other and more complex segmenting techniques may be designed to take into account information such as 3-D data from the input scene, without departing from the spirit of the present invention. This includes segmenting techniques that take into account 3-D model-based information from training scenes, for example.

Figure 3B:
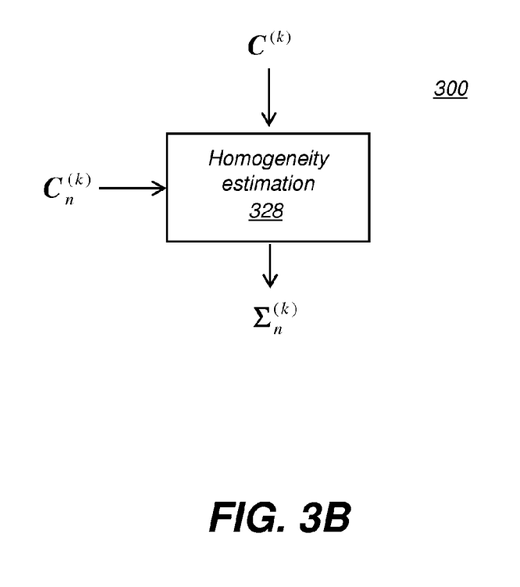
FIG. 3B is a logic flow diagram showing homogeneity estimation.

FIG. 3B shows processing logic for an adaptive 3-D region-homogeneity $\sigma_n^{(k)}$ estimation process 300. Inputs to this processing are as follows:
 (i) a current scene $C^{(k)}$; and
 (ii) a current labeled scene $C_n^{(k)}$.

Locally dependent homogeneity values are then computed for each region defined in segmentation step 324, such as for each 3-D region, at estimation step 328. Then, within each 3-D or other region, mean $\mu_n^{(k)}$ and standard deviation $\sigma_n^{(k)}$ of the magnitude of intensity differences (or gradient) $|f^{(k)}(c)-f^{(k)}(d)|$ for all possible pairs of voxels c, d in $C_n^{(k)}$ are then estimated. High gradient values, the upper $20^{th}$ percentile in one embodiment, are discarded in order to account for edge features that are at boundaries between the n regions. The locally adaptive region-homogeneity $\Sigma_n^{(k)}$ is an n-dimensional vector then, expressed by:

$$\Sigma_n^{(k)}=\mu_n^{(k)}+3\sigma_n^{(k)} \tag{3}$$

Homogeneity estimation process 300 of FIG. 3B terminates when all n regions have been processed. In one embodiment, the pair $(C_n^{(k)}, \Sigma_n^{(k)})$ is used for adaptively controlling the flow of diffusion on the image, including, for example, 3-D cone-beam CT images. As was described earlier with respect to equation (2), diffusion flow magnitude function $|V|$ has a maximum value at magnitude gradient $|F|=\Sigma_n^{(k)}$. $|V|$ is monotonically increasing for $|F|<\Sigma_n^{(k)}$ and monotonically decreasing for $|F|>\Sigma_n^{(k)}$. Since $\Sigma_n^{(k)}$ locally measures homogeneity (or, conversely, noise level), in particular 3-D regions of a scene $C^{(k)}$, fine control for anisotropic diffusion is achieved by expressing the diffusion conductance function as follows:

$$G^{(k)}(c,d) = e^{-\frac{|F^{(k)}(c,d)|^2}{2\{\Sigma_n^{(k)}\{f_n^{(k)}(c,d)\}\}^2}} \tag{4}$$

$$F^{(k)}(c,d) = \{f^{(k)}(c) - f^{(k)}(d)\}D(c,d) \tag{5}$$

where, for any 6-adjacent voxels c,d∈C such that c≠d, then D(c,d) is the unit vector along the direction from voxel c toward voxel d. $F^{(k)}(c,d)$ is the component of the intensity gradient vector along D(c,d). Intensity flow vector $V^{(k)}(c,d)$ from voxel c to voxel d at the kth iteration is defined by:

$$V^{(k)}(c,d)=G^{(k)}(c,d)F^{(k)}(c,d) \tag{6}$$

Iterative processing is defined as follows:

$$f^{(k)}(c) = \begin{cases} f(c) & \text{for } k = 0 \\ f^{(k-1)}(c) - t_s \Sigma_{d \in C} V^{(k-1)}(c,d) \cdot D(c,d) & \text{for } k > 0 \end{cases} \tag{7}$$

where $t_s$ is a time step constant for the diffusion process. Value $t_s$ is non-negative and has an upper bound limit that depends on adjacency criterion in order to keep the process stable. In one embodiment, the value $t_s=1/7$ is used.

The flow direction between any voxels c, d∈C is always such that it tries to reduce the gradient between them. That is: $V^{(k-1)}(c,d)\cdot D(c,d)$ is positive when $f^{(k)}(c)>f^{(k)}(d)$, and negative otherwise, and zero when c=d. Further, this diffusion process as described with respect to equations (4) through (7) is both nonlinear and anisotropic.

Figure 4:
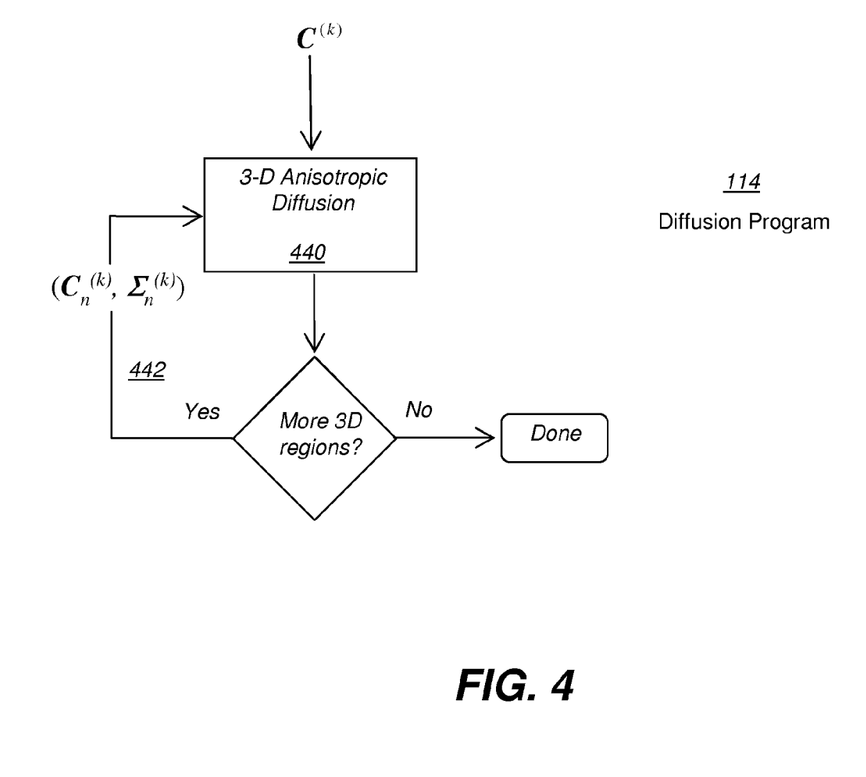
FIG. 4 is a logic flow diagram showing diffusion processing for multiple labeled 3-D regions.

The logic flow diagram of FIG. 4 shows how diffusion program 114 works for a 3-D image according to one embodiment. In this process, a current scene $C^{(k)}$ is filtered at diffusion filtering step 440 by a diffusion process described with respect to equations (4) through (7), which is locally controlled by the pair $(C_n^{(k)}, \Sigma_n^{(k)})$. This is performed as a process loop 442 iterates over all n 3-D regions. The output of program 114 is a filtered 3-D scene.

Figure 5:
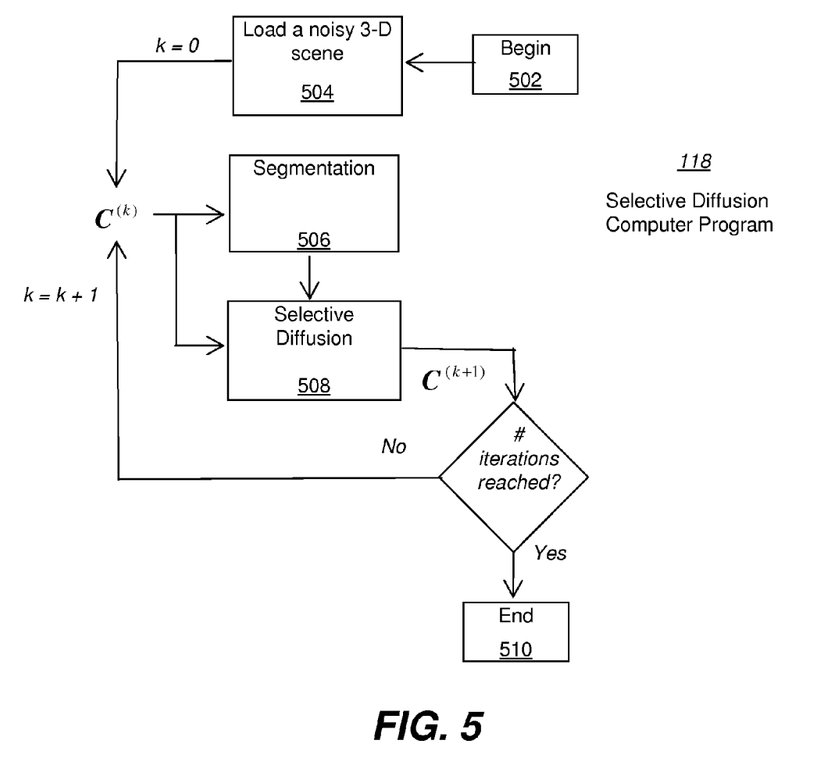
FIG. 5 is a logic flow diagram for the selective diffusion process according to one embodiment.

Referring back to FIG. 1A, selective diffusion program 118 is executed along with segmentation step 112 and diffusion step 114. FIG. 5 shows an example flow diagram for selective diffusion program 118, again, shown for a 3-D image. This processing begins at an initialization step 502. A noisy 3-D scene coming from an imaging equipment, for example but not limited to 3-D cone-beam CT imaging system, is loaded at a load step 504. This initial scene $C^{(k)}$ where k=0 (where k again denotes the iteration number) is, then, used as input for a segmentation step 506. The output of step 506 is a labeled scene $C_n^{(k)}$ containing n 3-D regions. A selective diffusion process is carried out at a diffusion step 508. Inputs for this method are:

(i) a current scene $C^{(k)}$; and (ii) a current labeled scene $C_n^{(k)}$.

The locally adaptive 3-D region-homogeneity $\Sigma_n^{(k)}$ is then computed and used to adaptively control the flow of diffusion on $C_n^{(k)}$. The output of step 508 is a filtered scene $C^{(k+1)}$ which serves as a new input for steps 506 and 508 upon subsequent iterations. As described earlier, this process repeats iteratively a predetermined number of times, or when image data characteristics appear to meet predetermined requirements, ending at a finalization step 510 and providing the filtered 3-D scene as output, such as on a display screen, for example.

Figure 6:
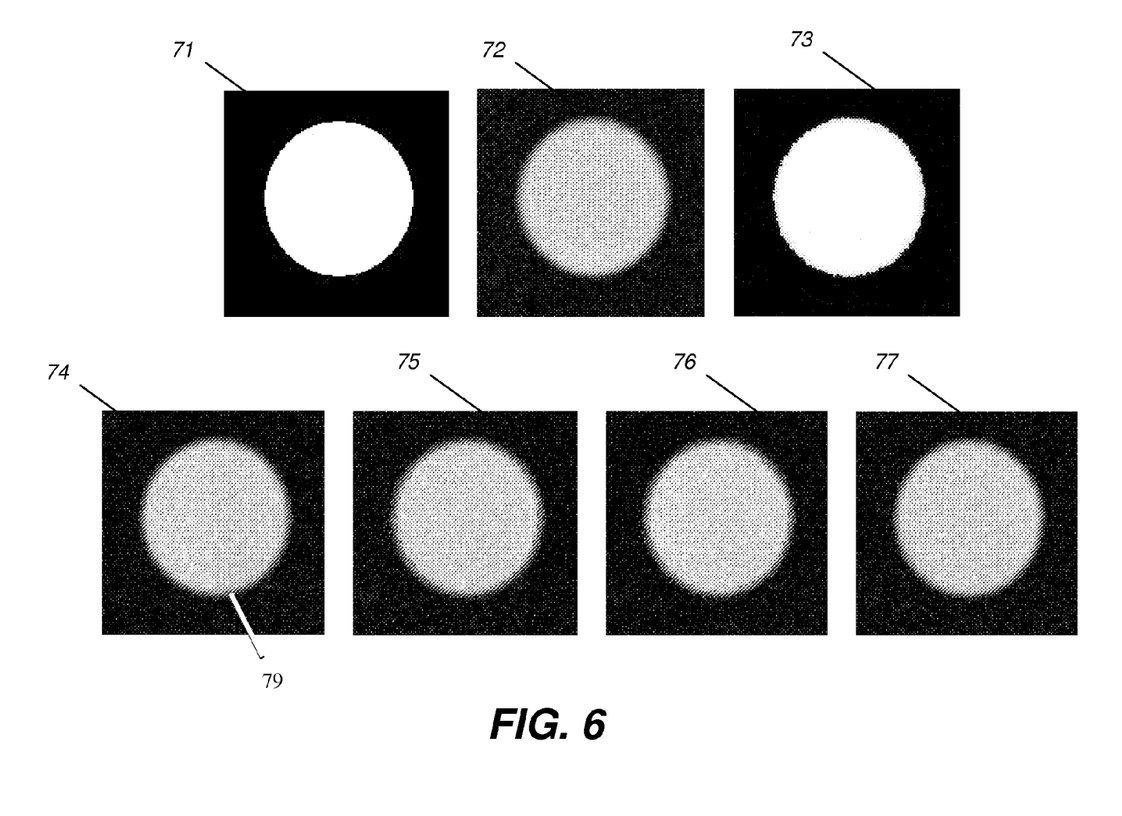
FIG. 6 shows a sequence of synthetic images processed using the method of the present invention.

FIG. 6 shows results from application of the present invention on a synthetic 2-D object. In the upper row of images 71, 72, and 73, the original object in image 71 has been blurred and corrupted by white-Gaussian noise, resulting in image 72. The resulting object, after applying the selective diffusion method to image 72, is shown in image 73. In the bottom row of FIG. 6 are images 74, 75, 76, and 77. Image 74 shows the original object boundary 79 as it would be superimposed on top-row image 72. Starting from the blurred noise image (72), images 75-77 depict the modification of the estimated object boundary, after 10 iterations (image 76), and after 500 iterations of the selective diffusion method (image 77), respectively. Thus, as this example shows, a sharply defined boundary is maintained, as shown in FIG. 6, while noise is reduced with successive iterations.

Figure 7:
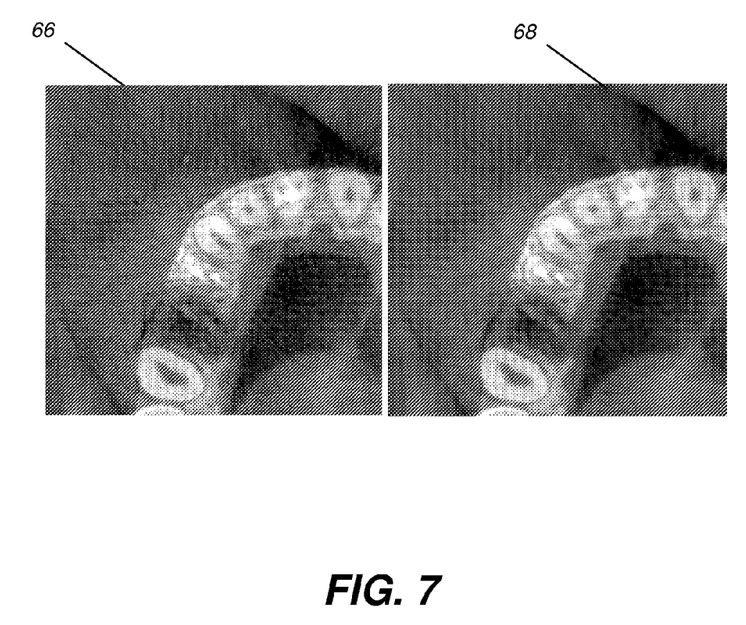
FIG. 7 shows original and filtered dental images by way of example.

The grayscale images in FIG. 7 show results from applying the method of the present invention in one embodiment for a dental cone-beam CT dataset, with an original image 66 to the left and a processed image 68 to the right. Processed image 68 shows the results of iteratively applying segmentation and selective diffusion according to embodiments of the present invention. In these results, noise is reduced in background regions without loss of definition in foreground features of interest.

The method of the present invention is suitable for noise suppression in 2-D and 3-D images as well as in images having four or more dimensions. Unlike earlier solutions for providing noise suppression, the method of the present invention uses an iterative sequence that combines segmentation and selective diffusion and uses results from each of these processes to improve each other's performance. Segmentation and labeling help to improve the performance of the diffusion processes; similarly, the results of diffusion then allow improved segmentation so that foreground features of an image are more closely identified and processed with appropriate noise suppression. Background contents of an image can have noise content more dramatically reduced without compromising the visibility of foreground features.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as magnetic media, CD-ROMs, hard drives, or any other machine-readable storage medium, wherein, when the program code is loaded into and executed by a machine, such as a computer, the machine becomes an apparatus for practicing the invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

66. Original image
68. Processed image
71, 72, 73. Image
74, 75, 76, 77. Image
79. Boundary
100. Image acquisition and processing system
102. Subject
104. CT scanner
106. Computer
110. Data store
112. Segmentation program
114. Diffusion program
118. Selective diffusion computer program
200. 3-D representation
300. Estimation process
324. Segmenting step
326. Labeling step
328. Estimation step
440. Step
442. Loop
502. Initialization step
504. Load step
506. Segmentation step
508. Diffusion step
510. Finalization step

What is claimed is:

1. A method for suppressing noise in a diagnostic image, the method comprising one or more iterations of:

segmenting the image to identify and label one or more regions in the image; and performing selective diffusion on at least one of the one or more labeled regions in the image by:

computing a homogeneity value for the region; and generating a diffusion conductance function for the region according to an intensity gradient between adjacent digital image elements within the region and applying the diffusion process to a plurality of digital image elements within the region.

2. The method of claim 1 wherein segmenting the image comprises comparing digital image element values within the image against a predetermined threshold and labeling one or more regions according to the comparison.

3. The method of claim 1 wherein segmenting the image comprises using 3-D model-based information.

4. The method of claim 1 wherein computing a homogeneity value for the region comprises computing an average value of magnitude of intensity differences or gradient for two or more digital image elements within the region.

5. The method of claim 4 further comprising computing a standard deviation for the magnitude of intensity differences or gradient for pairs of digital image elements within the region.

6. The method of claim 1 wherein the diagnostic image is a 2-D image.

7. The method of claim 1 wherein the diagnostic image is a 3-D image.

8. The method of claim 1 wherein the diagnostic image is a 4-D image or higher dimension image.

9. The method of claim 1 wherein the diagnostic image is reconstructed from a plurality of 2-D images.

10. The method of claim 1 wherein applying the diffusion conductance function further comprises reducing the magnitude of intensity differences or gradient for pairs of digital image elements within the region.

11. The method of claim 1 further comprising displaying the processed diagnostic image on a display screen.

12. The method of claim 1 wherein generating the diffusion conductance function comprises generating an anisotropic diffusion function.

13. A method for suppressing noise in a 3-D diagnostic image, the method comprising one or more iterations of:
- forming the 3-D diagnostic image from two or more separate images;
- segmenting the 3-D diagnostic image to identify and label one or more 3-D regions in the image; and
- performing selective diffusion on at least one of the one or more labeled 3-D regions in the image by:
  - computing a homogeneity value for the 3-D region; and
  - generating an anisotropic diffusion conductance function for the 3-D region according to an intensity gradient between adjacent digital image elements within the region and applying the diffusion process to a plurality of digital image elements within the region.

14. The method of claim 13 wherein segmenting comprises grouping adjacent image voxels according to their relative gradient intensity values.

15. The method of claim 13 wherein the 3-D diagnostic image is formed from two or more computed tomography scans.

16. A method for suppressing noise in a diagnostic image, the method comprising:
- segmenting the diagnostic image to identify and label one or more regions in the diagnostic image;
- performing selective diffusion on at least one of the one or more labeled regions in the diagnostic image to generate a filtered image, wherein the selective diffusion comprises:
  - computing a homogeneity value for the at least one of the one or more labeled regions; and
  - generating a diffusion conductance function for the at least one of the one or more labeled regions according to an intensity gradient between adjacent digital image elements within the at least one of the one or more labeled regions and applying the diffusion process to a plurality of digital image elements within the at least one of the one or more labeled regions;
- segmenting the filtered image to identify and label one or more regions in the filtered image;
- performing the selective diffusion on at least one of the one or more labeled regions in the filtered image.

* * * * *